UNITED STATES PATENT OFFICE.

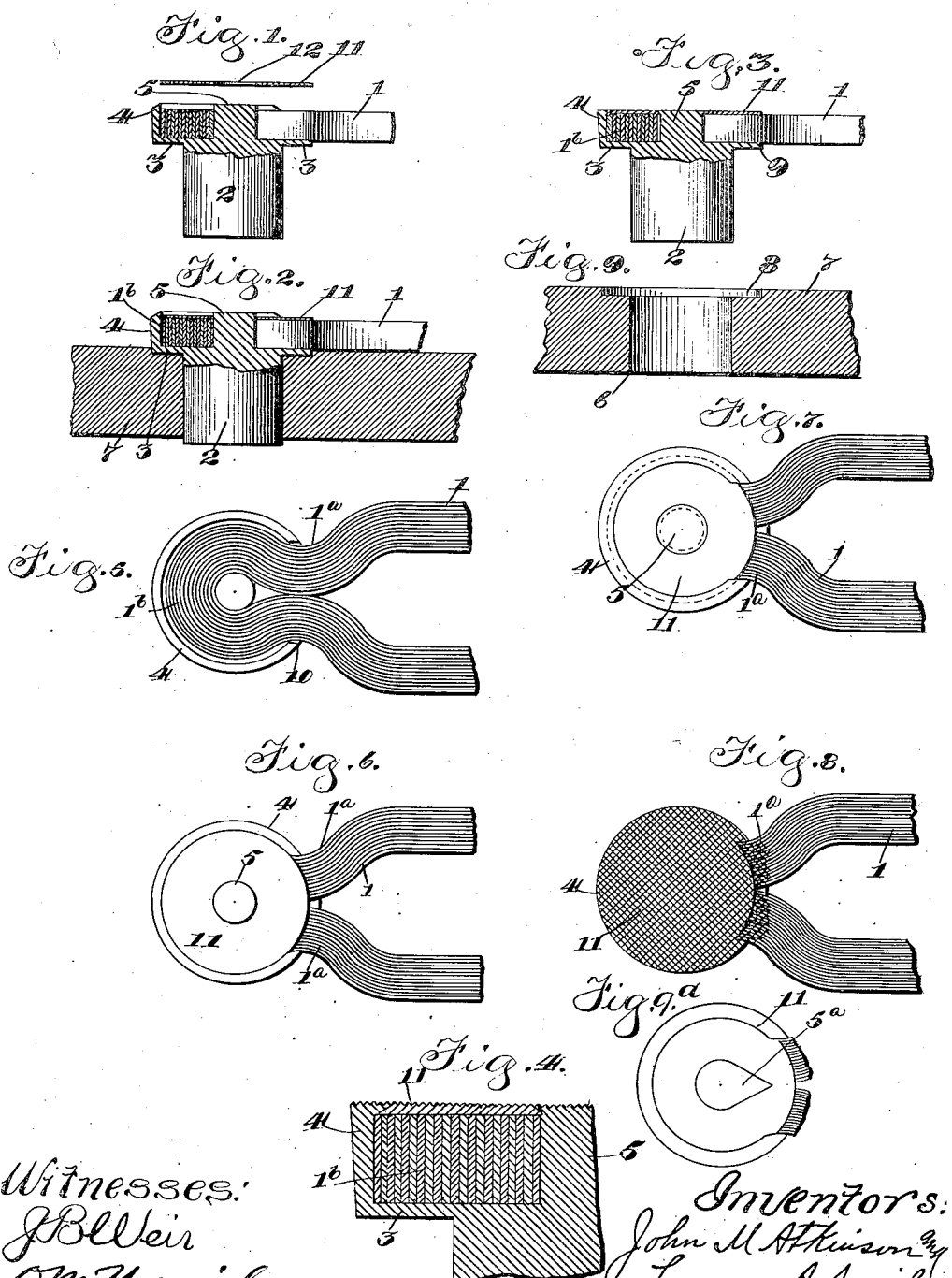

JOHN M. ATKINSON AND LYMAN A. SCOVIL, OF CHICAGO, ILLINOIS, ASSIGNORS, BY MESNE ASSIGNMENTS, TO GENERAL ELECTRIC COMPANY, A CORPORATION OF NEW YORK.

RAIL-BOND.

990,620.  Specification of Letters Patent.  Patented Apr. 25, 1911.

Application filed August 15, 1902, Serial No. 119,691. Renewed February 13, 1906. Serial No. 300,861.

*To all whom it may concern:*

Be it known that we, JOHN M. ATKINSON and LYMAN A. SCOVIL, citizens of the United States, residing at Chicago, in the county of Cook and State of Illinois, have invented certain new and useful Improvements in Rail-Bonds, of which the following is a full, clear, and exact specification.

Our invention relates more particularly to that class of rail bonds composed of two terminal ends welded to opposite ends of the body portion, usually composed of a plurality of strands or wires, this construction being preferable to the forms in which the terminals and the body are cast together, because the conductivity of cast metal is much less than the conductivity of that which is wrought or drawn. Great difficulty has been experienced, however, in effecting a perfect union between the terminal and the body by the welding methods, especially when the parts are composed of copper which readily corrodes or oxidizes when subjected to heat and exposed to the atmosphere, and wherever this oxidation occurs it is impossible to weld the surfaces together.

Our invention is directed to overcoming these difficulties, and it has for its primary object to provide improved means for effectually expelling and excluding the air from the surfaces to be welded during the welding operation.

Another object of the invention is to improve the form of the terminal whereby a larger area of contact and a more effectual electrical union of the bond with the rail is effected.

With these ends in view, our invention consists in certain features of novelty hereinafter described and shown in the accompanying drawings, and more particularly pointed out in the claims.

In the said drawings,—Figures 1, 2, 3 and 4 are longitudinal sectional views of one end of a rail bond constructed according to our improvements, illustrating the various steps in the course of manufacturing the same, Figs. 5, 6, 7 and 8 are plan or face views of the same, Fig. 9 is a detail sectional view of the web of the rail, showing the new form of socket or recess for our improved bond, and Fig. 9ª is a modification. Fig. 1 illustrates the end of the body portion in place on the terminal with the cap plate or washer about to be put in place, Fig. 2 is a similar view, showing the terminal in place in its socket in the rail, and the cap or washer in place against the body portion, Fig. 3 is a view similar to Fig. 2, with the rail omitted and showing the metal upset around the edges of the washer, Fig. 4 is an enlarged fragmentary section similar to Fig. 3, but showing the condition of the surfaces after being subjected to the final pressure in the welding operation, Fig. 5 is a plan or face view with the cap omitted, Fig. 6 is a similar view with the cap in place, Fig. 7 is a similar view with the metal upset around the edges of the cap, Fig. 8 is a similar view showing the formation resulting from the final pressure in the welding operation.

In illustrating the invention we have shown only one end of the bond, it being understood that the other end may be a duplicate of that shown or may be constructed in any other suitable way.

(1) is the body portion of the bond, which is preferably composed of a plurality of flat wires or strands coiled together in a familiar manner and secured to the end terminals, one of which only is shown in the drawings, and which comprises a lug portion (2), a head portion (3), and surrounding flange (4), and preferably a central boss (5). The lug portion (2) is adapted to be fitted into a socket or recess (6) in the web (7) of the rail or other part with which electrical connection is desired. According to our invention, however, the socket or recess (6) is counter-bored as shown at (8) so as to receive a circular shoulder (9) on the under side of the head (3) and thereby materially increase the area of contact between the bond and the rail, while at the same time effectually plugging the recess or socket in the rail web and thereby excluding air and moisture. As shown in Fig. 5 the surrounding flange (4) is circular and extends throughout more than 180 degrees of a circle, leaving a narrow passage (10) at one side for the reception of the neck-line portion (1ª) of the body (1) where the sides of the body diverge on the one hand after leaving the head of the terminal, and on the other hand where they pass around the boss (5) in forming a loop (1ᵇ) which engages over the boss and substantially fills the annular space between the inner periphery of the flange (4) and the boss. With the flange (4) thus embracing the rounded end of the body (1) it will be seen that by subjecting the parts while cold, that is, at temperatures sufficiently low to avoid objectionable oxidation of the copper to a sufficient degree of pressure on the face side to distort them the tendency of the flange will be to crowd inwardly against the ribbons or strands of the body and the tendency of the boss (5) to crowd the strands outwardly against the flange, the flange pressing toward the center substantially in all directions, while the lateral swelling of the strands causes them to crowd in both directions against the flange and the boss, so that all air is expelled from between the parts. By this method the end of the body is rigidly gripped within the flange and all the contacting surfaces are mashed together and compacted with great pressure. In order, however, that the outer surface of the end (1ᵇ), which is embraced by the flange, may be hermetically sealed and the air excluded from any crevices which might still exist upon removal of the pressure we lay upon the surface or face of the end (1ᵇ), within the flange, a washer plate or cap (11), which is thus placed before the parts are subjected to the upsetting degree of pressure just referred to, and this cap is preferably provided with a central aperture (12) for the introduction of the outer end of the boss (5), the boss (5) and the flange (4) projecting outwardly a slight distance beyond the outer edge of the strands, so as to provide for the metal being upset around the edges of the cap when the device is subjected to pressure, as shown in Fig. 3.

Sufficient pressure for upsetting the edges of the flange (4) and boss (5) over the cap or washer (11), and at the same time mashing the strands of the end (1ᵇ), as before described, may be afforded by any suitable hammer, or press leaving the device in the condition shown in Figs. 3 and 7, after which it is subjected to the welding degree of heat and struck or pressed between dies or other suitable means producing the welding of the surfaces, the welding die being preferably provided with a rough surface which obliterates the seams between the cap, the boss and the flange and produces the appearance illustrated in Figs. 4 and 8. In actual practice, however, the strands composing the head (1ᵇ), the washer or cap, the boss (5) and the flange (4) virtually become homogeneous or integral after they are subjected to the final step in the welding operation.

In Fig. 9ᵃ of the drawings we have shown a boss (5ᵃ) which is V shaped on one side so as to completely fill the V space formed where the sides of neck (1ᵃ) converge. This is useful in excluding the air that might otherwise exist in such space. In this instance the cap (11) has a V shaped orifice for the boss to pass through.

Having thus described our invention what we claim as new therein, and desire to secure by Letters Patent, is—

1. In a rail bond the combination of a terminal comprising a lug, a flanged head, a body portion having its end resting against said head and partially surrounded by said flange, and a cap separate from said flange and secured therein against said body portion, substantially as set forth.

2. In a rail bond the combination of a terminal comprising a lug, a flanged head, a body portion having its end resting against said head and partially surrounded by said flange, and a cap secured within said flange against said body portion, the edges of said flange being turned over the edges of the cap, substantially as set forth.

3. In a rail bond the combination of a terminal comprising a lug, a flanged head, and a boss surrounded by said flange, a body portion having its end resting against said head and partially surrounded by said flange, and a cap secured within said flange against said body portion, the edges of said flange being turned over the edges of said cap, substantially as set forth.

4. In a rail bond the combination of a terminal comprising a lug, a flanged head, and a boss surrounded by said flange, a body portion having its end resting against said head around said boss, and a cap having an aperture through which said boss passes, arranged within said flange, the edges of said flange and boss being turned over the edges of said cap, substantially as set forth.

5. The herein described method of attaching the terminals of rail bonds to their body portions, which consists in forming a terminal with a surrounding flange, placing the body portion within said flange against the terminal, placing a cap within said flange over the body portion, squeezing the body portion between the cap and the terminal until the distortion of the metal expels the air, then subjecting the whole to a welding degree of heat and finally to pressure, substantially as set forth.

6. A rail bond comprising terminal heads, each provided with a projection and an overturned portion, a body portion having parts arranged to surround said projections, and a plate or cap for each terminal head located over the part of the body portion surrounding the projection on that head and being secured in position by the compression upon it of the overturned portion of said head.

7. A rail bond comprising a terminal head formed with a projection and an overturned portion, a body portion having a part looped around said projection, and a cap or plate located over said looped part and secured in position by the compression upon it of said overturned portion of the terminal head, said body portion, terminal head, and plate or cap being welded together to form a homogeneous structure.

8. A rail bond comprising a body portion provided with loops at its opposite ends, terminal heads each provided with a projection upon its upper end, a flange surrounding each of said projections but separated therefrom by a space adapted to receive one of said loops, and a plate or cap located over each of said loops, said flange being adapted to be turned over upon the plates, the terminal heads, loops and plates being welded together to form a homogeneous structure.

9. The combination, in a rail bond, of a body portion, a terminal head, the said head being provided upon one end with a circular flange surrounding a loop formed in the body portion of the bond, and a separate plate surrounded and secured by said flange and contacting with the said loop, substantially as described.

10. A rail bond comprising a flexible body portion and terminal head therefor, the body portion being looped over a projection on the terminal head and surrounded by a metallic casing, the body portion, head and casing being compressed together and welded to form a homogeneous structure.

11. The method of forming an electrical conductor having a flexible body portion and a terminal portion or end which consists in forming a head or terminal part with a projection, looping the flexible conductor about said projection, inclosing the body end with a metal shell, compressing the parts together when cold to force them into a substantially solid mass from which substantially all air is removed, and thereafter welding the parts together by the application of heat and pressure.

12. The method of forming an electrical conductor having a flexible body and a terminal or end which consists in providing a solid end piece, looping the flexible conductor about a portion of said end piece, covering said end portion with a cap, compressing the portions together when cold, compacting the same to remove the air, and thereafter welding the parts together by the application of heat and pressure.

13. The method of forming an electrical conductor having a stranded body portion and an end or terminal portion which consists in forming a solid end piece and a cap in such manner that a portion of the stranded conductor may be inserted in a recess between the end piece and the cap, inserting said portion in said recess, after such insertion compressing the end piece, cap and inserted portion of the stranded conductor cold to compact the same and remove the air, and thereafter welding the parts together by the application of heat and pressure.

14. The method of forming a conductor having a stranded body portion and a terminal portion which consists in inclosing a portion of the stranded conductor in a metallic casing, compressing the casing and inclosed portion together while cold to form a substantially solid mass from which all air is removed, and thereafter heating said portion and said casing and welding them together.

15. The method of forming a conductor having a stranded body portion and a terminal portion which consists in inclosing a bight of a stranded conductor in a channel formed in a metallic casing, pressing the casing and the bight together while cold to form a substantially solid mass from which all air is excluded, and thereafter heating said portion and casing and welding them together.

JOHN M. ATKINSON.
LYMAN A. SCOVIL.

Witnesses:
M. B. ALLSTADT,
CHARLES E. FELT.